US006843260B2

(12) United States Patent
Trahan

(10) Patent No.: US 6,843,260 B2
(45) Date of Patent: Jan. 18, 2005

(54) VIBRATING ABRASIVE CLEANING APPARATUS AND METHOD

(75) Inventor: Joe O. Trahan, Lafayette, LA (US)

(73) Assignee: Trojan Rental and Sales, Lafayette, LA (US)

( * ) Notice: Subject to any disclaimer, the term of this patent is extended or adjusted under 35 U.S.C. 154(b) by 158 days.

(21) Appl. No.: 10/010,278

(22) Filed: Nov. 5, 2001

(65) Prior Publication Data

US 2003/0084915 A1 May 8, 2003

(51) Int. Cl.[7] .................................................. B09B 3/12

(52) U.S. Cl. ............................... 134/184; 134/1; 134/7; 134/10; 134/111; 451/104; 451/326; 451/328; 451/329; 451/330

(58) Field of Search .......................... 134/1, 7, 10, 111, 134/184, 201; 451/32, 36, 104, 326, 328, 329, 330

(56) References Cited

U.S. PATENT DOCUMENTS 5,460,566 A * 10/1995 Trahan ...................... 451/326

* cited by examiner

*Primary Examiner*—Michael Barr
*Assistant Examiner*—Gentle E. Winter
(74) *Attorney, Agent, or Firm*—The Matthews Firm

(57) ABSTRACT

This invention relates to a vibrating abrasive cleaning apparatus and method which is powered by at least one electric motor specially fabricated to the cleaning container assembly mounted on a rigid square tubing frame on one side by compression springs, on the opposite side by tension springs. The compression springs and tension springs have a different spring rate which produces better rolling of the media and therefore, faster circulation and cleaning. The specially fabricated electric motor attached to the cleaning container provides for enhanced oscillation and much greater cleaning capabilities thereby reducing the cleaning time. The entire vibrating assembly sits on a base and has a lid operated by a cable and counterweight for ease in loading the container for oscillation of the parts.

6 Claims, 5 Drawing Sheets

FIG. 7
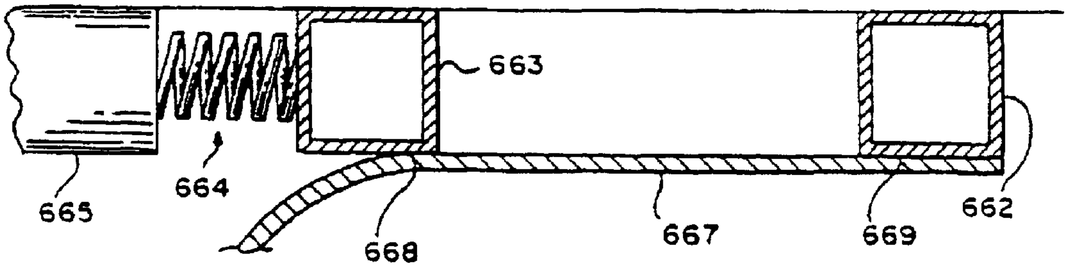
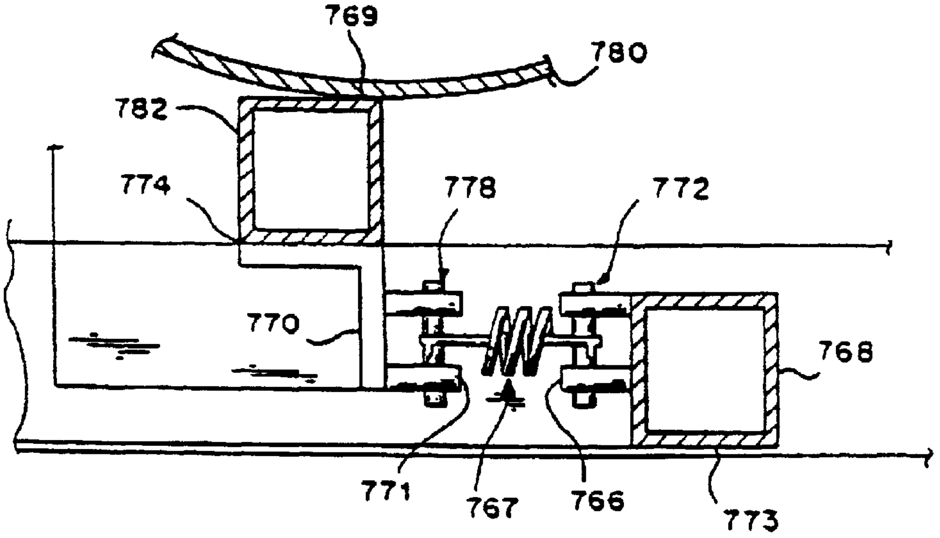
FIG 8

VIBRATING ABRASIVE CLEANING APPARATUS AND METHOD

TECHNICAL FIELD

The present invention relates generally to a new and improved cleaning apparatus and method and more particularly to an improved vibrating abrasive cleaning apparatus and method which provides for additional options and more efficient cleaning capabilities through enhanced agitation and an improved method. More specifically, the present invention relates to an improved vibrating abrasive cleaning apparatus and method for cleaning various articles through the use of a combined solid and fluid mixture, wherein the residue is environmentally reprocessed through the system.

BACKGROUND ART

As environmental concerns began to emerge, many new inventions were geared toward developing a more environmentally conscious design or plan. Typically, in the field of vibratory devices used for cleaning articles, a more environmentally sound design was preferred in which productivity could be increased and waste decreased. This led to the concept of creating a device and method wherein an article would be cleaned in a combined solid and fluid mixture, such that the residue was not discarded but reprocessed through the system. More conventional vibrating and abrasive cleaning apparatus have failed to address environmental concerns by discarding the waste material from the cleaning method. Further, as commercial needs rise, productivity becomes a priority in the design and methods used in the field of vibratory cleaning devices. Conventional vibrating and abrasive cleaning apparatus have not addressed, nor met, the desired increased productivity demands made by the commercial industry.

Accordingly, Applicant's disclosure on Jul. 25, 1995, further demonstrates the present invention's improvements needed to meet commercial concerns in the area of vibrating and abrasive cleaning apparatus. Applicant's disclosure comprised the use of square tubing to house an angularly disposed container which provided increased stability, volumetric capacity, and better rolling of the media and solids about the container. Further, Applicant's disclosure disclosed an improved drainage system which incorporated a mating, interchangeable, port assembly allowing for the removal of the housing and square tubing frame assembly from the drainage system. Applicant's disclosure further incorporated the addition of counterweights on the eccentric shaft assembly and the use of clevis pins and cotter pins to secure all vibration tension springs. Finally, Applicant's disclosure incorporated an interchangeable and closed solvent circulation/filtration system and enhanced oscillation means for reduced cleaning time.

However, Applicant's disclosure fails to address alternatives for enhanced oscillation which results in a much shorter cleaning time and enhanced cleaning capabilities. Specifically, Applicant's disclosure did not address the improvements as claimed and described herein such as the use of an electric motor which is specially fabricated directly to the cleaning container for optimum cleaning performance and a much shorter cleaning time. Further, Applicant's disclosure did not address the positioning of the cleaning container in an upright mounted perpendicular position which when coupled with the fabricated electric motor provides for greater cleaning capabilities. Thus, Applicant's previous disclosure and conventional vibrating and abrasive cleaning apparatus failed to address the commercial concerns for an improved vibrating abrasive cleaning apparatus and method with an enhanced oscillation means for reduced cleaning time and more efficiency.

Accordingly, it is an object of the present invention to provide an improved vibrating abrasive cleaning apparatus and method of use for the same.

SUMMARY OF THE INVENTION

The present invention comprises an improved apparatus and method for cleaning articles in a fluid and oscillating medium, the apparatus comprising a frame; a container having a central axis perpendicular to an article inlet opening in the container and mounted to the frame so that the central axis of the container is non-perpendicular to a horizontal cross-section of the frame by a means of a plurality of opposing parallel compression and tension springs having differing spring rates for enhanced oscillation of the container which holds the articles; a means for injecting a cleaning fluid into the container for cleaning the articles in the container; an enhanced means for oscillating the container within the frame; a means for draining excess debris and cleaning fluid from the articles in the container once oscillation begins; and a means for filtering and recirculating the cleaning fluid from the solid debris back into the container.

A preferred embodiment's electric motor specially fabricated to the cleaning container and upright positioning of the cleaning container, generally helps attain enhanced cleaning capabilities and a much shorter cleaning time therefore satisfying commercial concerns.

An improved method for cleaning articles using the invention's improved vibrating cleaning apparatus is also provided, the method comprising the steps of placing articles in a container with an abrasive media and cleaning fluid; engaging at least one electric motor; pumping the cleaning fluid through a filter system; injecting the cleaning fluid into the container; oscillating the container; and recirculating the cleaning fluid through a series of filters back into the container through an injection means.

This summary is not intended to be a limitation with respect to the features of the invention as claimed, and this and other objects can be more readily observed and understood in the detailed description of the preferred embodiment and the claims.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 7 is an exploded cross-sectional view of the compression spring assembly.

FIG. 8 is an exploded cross-sectional view of the tension spring assembly.

GENERAL DESCRIPTION AND PREFERRED MODE FOR CARRYING OUT THE INVENTION

Figure 1:
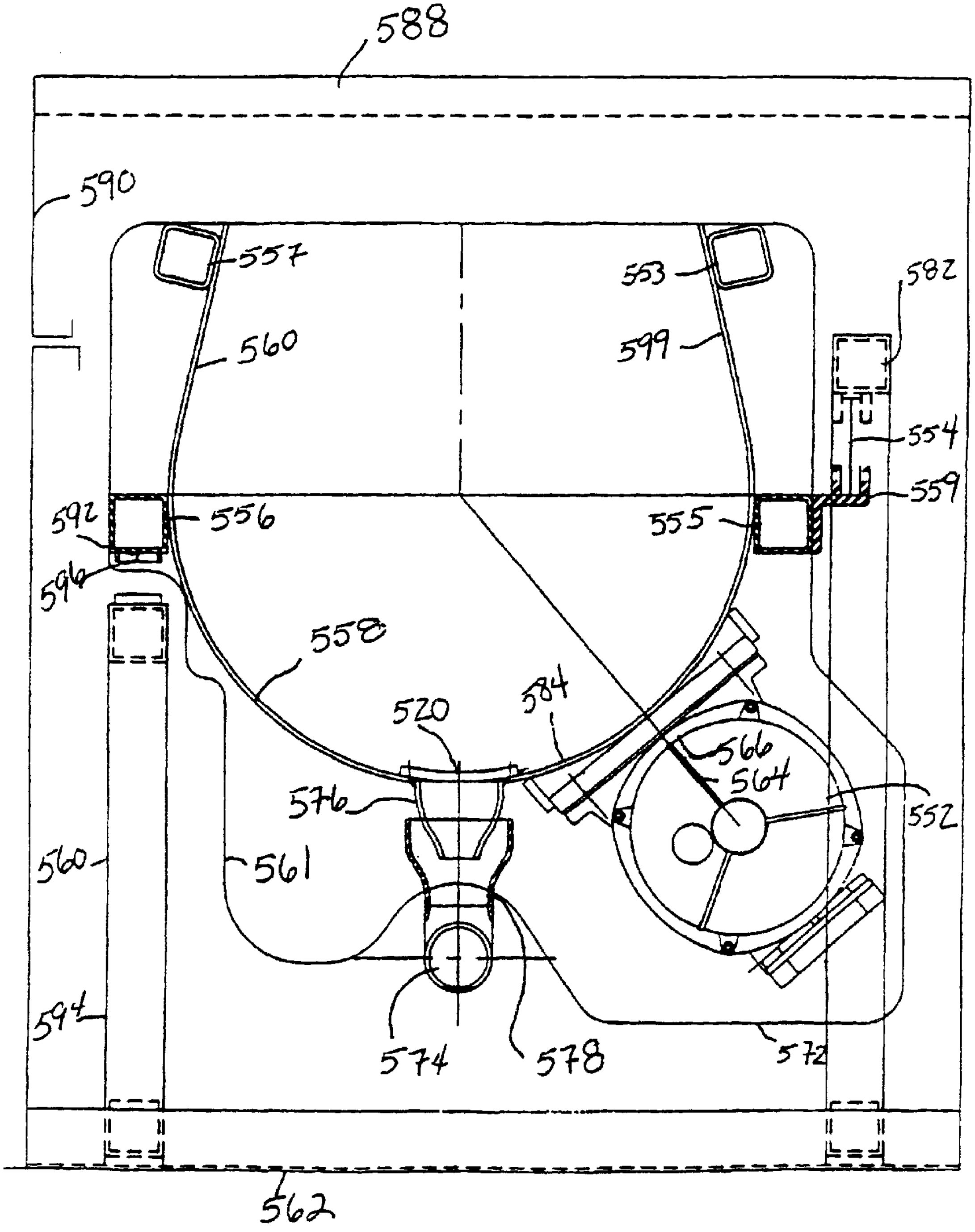
FIG. 1 is a projected view of the vibrating abrasive cleaning apparatus and filtration system.

FIG. 1 is a cross-sectional view of the container and frame assembly wherein a container 558 is offset from a drainage housing 561, which is supported and held in place by square tubing members 560, 562, and 582. Container 558 has perforated openings at 520 to allow the debris and solvent to enter and drain into the drainage nozzle 576, port opening 578, and tubing duct 574. The container 558 is supported by 5 welded square tubing supports at 553, 555, 584, 556 and 557 which operate freely in movement by a series of compression and tension springs which are further depicted in FIGS. 4 and 5. The container is oscillated by engaging the fabricated electric motor 552 which can be positioned on the container 558 at various positions. Although only one motor 552 is depicted, more than one motor 552 can be fabricated to the container 558 for enhanced oscillation of the container 558. Support member 559 acts to support on e end of the tension spring 554 which extends vertically upward and terminates at joint 582 which also supports the tension spring. The container is upright and vertically disposed from the housing reservoir 561 to allow the electric motor assembly 552 greater oscillation and movement thus allowing better oscillation and decreased cleaning time. The entire housing 561 and container assembly 558 are secured within the vibrating abrasive cleaning apparatus by square tubing members 553, 555, 556, and 557 and thus, are housed by square tubing member 562, 590 and lid 588. Support member 559 is welded to square tubing member 555. Support member 559 is welded to square tubing member 555, however, member 582 acts independently and freely to allow tension spring 554 to dampen the container's 558 movement in conjunction with compression spring 592 during the oscillation period. The compression spring 592 is secured to square tubing member 594 at 596. A liner 599 is used to line the container and allows freedom of the articles and media to rotate with minimal friction against the container's interior walls. The liner 599 has an expanded metal back and possesses a preferred durometer rating of 90.

Figure 2:
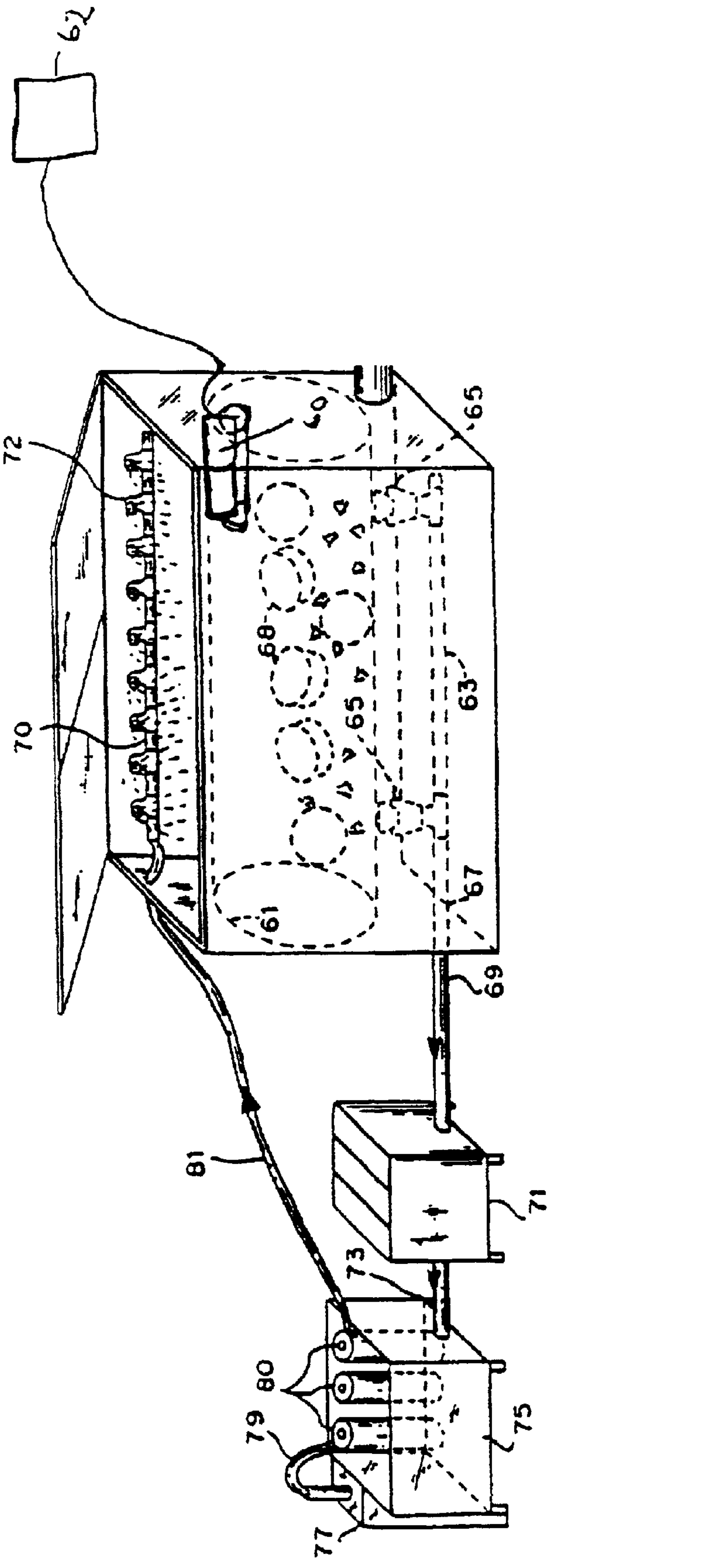
FIG. 2 is a cross-sectional view of the container and frame assembly.

FIG. 2 is a projected view of the entire vibrating abrasive cleaning apparatus demonstrating the solvent flow direction. As seen in FIG. 1, the electric motor 552 is specially fabricated to the container 61 of FIG. 2 to provide for oscillation. A power source 62 drives the electric motor 60. Once oscillation and vibration begin to clean the articles, thread protectors 68 in the container 61, the nozzle manifold 70 projects the solvent through nine injection nozzles 72 into the container 61 during the oscillation period. During and after oscillation, the debris and contaminated solvent from the thread protectors pass through the drainage assembly 65 and into the hydraulic drain manifold 63 below the container 61. The contaminated solvent then exist the vibrating abrasive cleaning apparatus at 67 through hose 69 and into the sediment tank 71 for filtration of the solids from the solvent. The solvent then passes through line 73 into a filtration tank 75 which contains a submersible centrifugal pump 77 to inject the contaminated solvent through hose 79 into a triformed filter cartridge 80 which exits as clean solvent through return hose 81 and back into the system through the nozzle manifold at 70 and nine injection nozzles 72. The number of injection nozzles used on the nozzle manifold naturally depends on the size of the vibrating abrasive cleaning apparatus.

Figure 3:
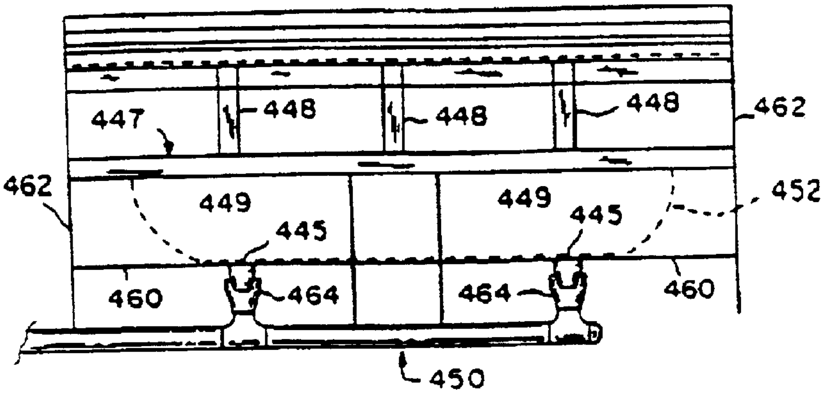
FIG. 3 is a front view of the container assembly.

FIG. 3 is a front view of the container assembly showing a preferred embodiment of a square tubing frame members 447 and 448 welded together to support the torque of the container during oscillation. Further, the container 452 is housed by steel plates 460 and 462 which surround the frame members and provide an enclosure 449 creating a reservoir for the container. Drainage assembly 450 is interchangeable with the housing plate 460 by means of mating male nozzle openings 445 that adapt to and interchangeably fit within ports 464.

Figure 4:
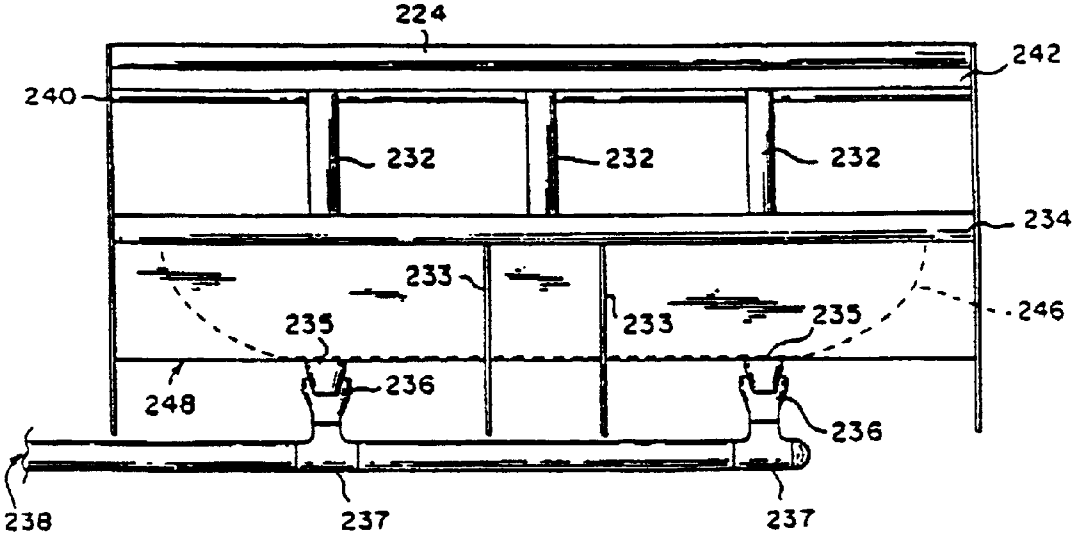
FIG. 4 is a cross-sectional top view of the drainage assembly.

FIG. 4 shows the drainage assembly wherein structural framing members 232 are fabricated square tubing to rigidly support the container once oscillation begins and is further supported by square tubing members 234, 242, and 240. Thus, the top of the vibrating abrasive cleaning apparatus 224 rests on and is supported by square tubing member 242. Fluid nozzle openings 235 allow the solvent to exit the container 246 and enter the ports 236 and down into tubing 237 which exits at 238 into the sediment tank. Steel supports 233 act to secure the square tubing members 234, 242, and 240 in place and in connection with the basin 248 from which the drainage assembly beginning with ports 236 and tubing 237 may be easily and temporarily removed for such necessities as cleaning. It is the preferred embodiment to perforate the nozzle openings 235 wherein the nozzles comprise a concentric nozzle type reducer, interchangeable with a female adapted port type reducer 236 which is welded to a schedule 40 tubing tee 237 and duct 238.

Figure 5:
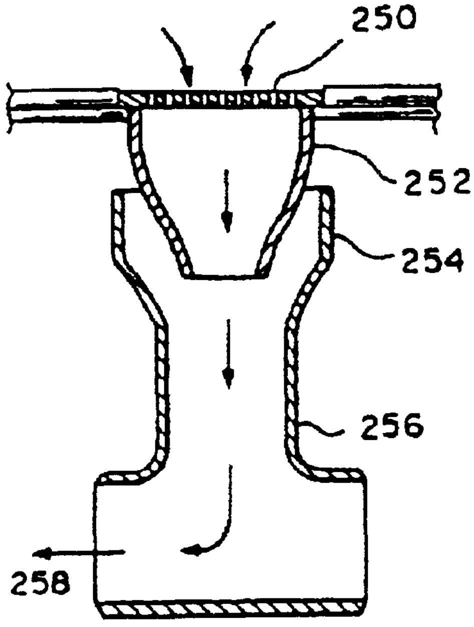
FIG. 5 is an exploded view of the mating, interchangeable, port assembly revealed in FIG. 4.

FIG. 5 generally depicts the solvent's path once the solvent exits the container 246 in FIG. 4 and passes through perforated nozzle openings 250 through the concentric nozzle type reducer into the port type reducer 254 and into the schedule 40 tubing tee 256. Thus, the contaminated solvent then passes into duct 258 and onto the filtration process.

Figure 6:
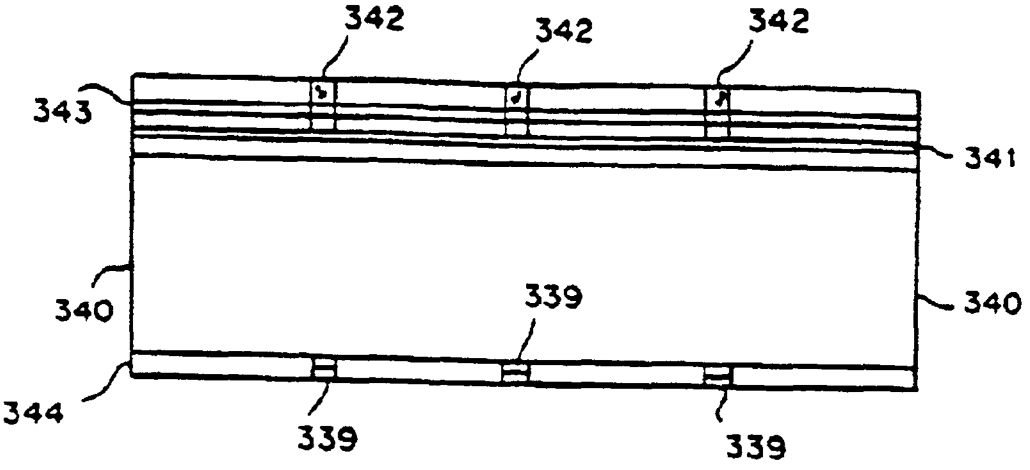
FIG. 6. is a cross-sectional top view of the frame assembly.

FIG. 6. depicts a cross-sectional top view of the frame assembly where said compression springs are held in place at holes 339 on the front square tubing member 344 which is attached by steel plates 340 to runners 341 and 343 which contain perforated holes to hold the tension springs in place at 342.

FIG. 7. is an exploded view of the compression spring assembly of FIG. 2 wherein square tubing joint 662 is vertically disposed above square tubing joint 663. Square tubing joint 663 provides the uppermost support for the compression spring 664 which terminates in compression at the most distal upper portion of the square tubing frame at 665. The container 667 is welded to square tubing joint 662 at 669 and square tubing joint 663 at 668 to enable the container to freely move during the oscillation period.

FIG. 8 further depicts the tension spring assembly of FIG. 2 wherein square tubing joint 768 is attached to the interior of the vibrating abrasive cleaning apparatus at 773 and secures vertical support member 766 which secure bolt 772. Tension spring 767 is therefore, vertically disposed in tension between bolts 772 and 778, wherein the lowermost portion of the tension spring secured to bolt 778 is also secure by a vertical support member 771 attached to an L shaped plate 770 which freely moves the container 780. Support members 766 and 771 are preferably clevis type supports, wherein bolts 778 and 772 are secured therein by cotter type pins (not shown). The container 780 is thus, welded to square tubing joint 782 at 769. Square tubing joint 782 is also attached to L-shaped plate 770 at 774.

It is the preferred embodiment to provide variable spring rates between the compression springs and tension springs embodied in FIGS. 7 and 8.

Although the invention has been described with reference to a specific embodiment, these descriptions are not meant to be construed in a limiting sense. Various modifications of the disclosed embodiments, as well as alternative embodiments of the invention will become apparent to persons skilled in the art upon reference to the description of the invention. It is therefore contemplated that the claims will cover any such modifications or embodiments that fall within the true scope of the invention.

What is claimed is:

1. An improved apparatus for cleaning articles in a fluid and oscillating medium, which comprises:

a frame;

a container having a wall with interior and exterior surfaces, and having a central axis perpendicular to an article inlet opening in the container and mounted to the frame so that the central axis of the container is non-perpendicular to a horizontal cross-section of the frame by means of a plurality of opposing parallel compression and tension springs having differing spring rates for enhanced oscillation of the container which holds the articles;

a means for injecting a cleaning fluid into the container for cleaning the articles in the container;

an electric motor within said frame and connected directly to the exterior wall of said container, said motor having a rotating shaft with at least one eccentric weight thereon causing said motor and said container to vibrate;

a means for draining excess debris and cleaning fluid from the articles in the container once oscillation begins; and a means for filtering and recirculating the cleaning fluid from the solid debris back into the container, the filter means comprising a series of filters.

2. The apparatus of claim 1 wherein the frame comprises a plurality of integrally connected unitary components of square tubing for facilitating stability of the container, oscillating means, and drainage means.

3. The apparatus of claim 1 wherein the container is mounted to the frame by a plurality of opposing parallel compression and tension springs for oscillation of the container.

4. The apparatus of claim 1 wherein the injection means comprises:

an intake manifold; and a plurality of injection nozzles horizontally displaced on the intake manifold and over the container for injection of a cleaning fluid into the container to clean the articles contained therein.

5. The apparatus of claim 1 wherein the drainage means comprises:

an opening in the container;

a reservoir below the opening and containing a plurality of ports;

a plurality of nozzles connected to the reservoir and ports and in alignment with the filter means.

6. The apparatus of claim 1 wherein the filter means comprises:

a duct leading from the draining means to a first filter and;

a duct leading from the first filter to a second filter wherein the second filter contains a circulation pump assembly to circulate the cleaning fluid back into the container through the injection nozzle means.

* * * * *